United States Patent
Wu

(10) Patent No.: US 9,197,464 B2
(45) Date of Patent: Nov. 24, 2015

(54) RECEPTION CIRCUIT

(71) Applicant: NOVATEK Microelectronics Corp., Hsin-Chu (TW)

(72) Inventor: Tse-Hung Wu, New Taipei (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 0 days.

(21) Appl. No.: 13/949,220

(22) Filed: Jul. 23, 2013

(65) Prior Publication Data

US 2014/0029699 A1   Jan. 30, 2014

(30) Foreign Application Priority Data

Jul. 24, 2012 (TW) ............................... 101126590 A

(51) Int. Cl.
  *H03K 17/16* (2006.01)
  *H04L 25/12* (2006.01)
  *H04L 25/02* (2006.01)

(52) U.S. Cl.
  CPC ............ *H04L 25/12* (2013.01); *H04L 25/0278* (2013.01)

(58) Field of Classification Search
  CPC ... H04B 3/30; H04L 25/0292; H04L 25/0278
  USPC .................................. 326/21, 22, 26, 30, 82
  See application file for complete search history.

(56) References Cited

U.S. PATENT DOCUMENTS

| | | | |
|---|---|---|---|
| 7,315,185 B2* | 1/2008 | Yu et al. ........................... | 326/30 |
| 7,986,161 B2* | 7/2011 | Lee et al. ......................... | 326/30 |
| 2006/0071683 A1* | 4/2006 | Best et al. ........................ | 326/30 |
| 2008/0001621 A1* | 1/2008 | Sinha et al. ..................... | 326/30 |
| 2011/0193591 A1 | 8/2011 | Nguyen | |
| 2012/0187978 A1* | 7/2012 | Fazeel et al. .................... | 326/30 |
| 2012/0256654 A1* | 10/2012 | Cho ................................ | 326/30 |
| 2014/0139261 A1* | 5/2014 | Nguyen .......................... | 326/30 |

FOREIGN PATENT DOCUMENTS

| | | |
|---|---|---|
| CN | 101213758 A | 7/2008 |
| CN | 102164039 A | 8/2011 |

* cited by examiner

*Primary Examiner* — Don Le
(74) *Attorney, Agent, or Firm* — Winston Hsu; Scott Margo

(57) ABSTRACT

The present invention discloses a reception circuit capable of enhancing accuracy of signal reception. The reception circuit includes a variable termination resistance unit, coupled to at least one channel, for utilizing at least one termination resistance corresponding to the at least one channel to perform impedance matching, a receiver, coupled to the at least one channel, for receiving a calibration signal to generate a digital calibration signal, and a data determination control unit, for comparing the digital calibration signal with a predefined data, to adjust the at least one termination resistance.

18 Claims, 9 Drawing Sheets

RECEPTION CIRCUIT

BACKGROUND OF THE INVENTION

1. Field of the Invention

The present invention relates to a reception circuit, and more particularly, to a reception circuit which can generate a digital calibration signal according to a received calibration signal, and then determine whether the digital calibration signal conforms with a predefined data to adjust a termination resistance or characteristics of a receiver for calibration, so as to enhance accuracy of signal reception.

2. Description of the Prior Art

In general, in the interface circuit receiver, a termination resistance matching resistor is required to maintain the completeness of signal reception, i.e. when a termination resistance matching resistor of the receiver is accurately matched with termination resistance of the transmitter, accuracy of signal reception can be enhanced.

Please refer to FIG. 1, which is a schematic diagram of a conventional interface circuit receiver 10. As shown in FIG. 1, in most applications, when the interface circuit receiver 10 receives a differential signal from the transmitter via channels CH1 and CH2, a termination resistance matching resistor R is required to be set in the channels CH1 and CH2, to achieve impedance matching and reduce signal reflection, so that accuracy of signal reception is enhanced.

However, in practical applications, the resistance of the single termination resistance matching resistor R varies with many factors. Therefore, it is hard to realize the termination resistance matching resistor R with a resistance capable of accurately matching with termination resistance of the transmitter, so that the received data is incorrect. Thus, there is a need for improvement of the prior art.

SUMMARY OF THE INVENTION

It is therefore an objective of the present invention to provide a reception circuit which can generate a digital calibration signal according to a received calibration signal, and then determine whether the digital calibration signal conforms with a predefined data to adjust a termination resistance or characteristics of a receiver for calibration, so as to enhance accuracy of signal reception.

The present invention discloses a reception circuit for enhancing accuracy of signal reception. The reception circuit includes a variable termination resistance unit, coupled to at least one channel, for utilizing at least one termination resistance corresponding to the at least one channel to perform impedance matching; a receiver, coupled to the at least one channel, for receiving a calibration signal to generate a digital calibration signal; and a data determination control unit, for comparing the digital calibration signal with a predefined data, to adjust the at least one termination resistance.

The present invention further discloses a reception circuit for enhancing accuracy of signal reception. The reception circuit includes a receiver, coupled to at least one channel, for receiving a calibration signal to generate a digital calibration signal; and a data determination control unit, for comparing the digital calibration signal with a predefined data to adjust at least one characteristic of the receiver.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
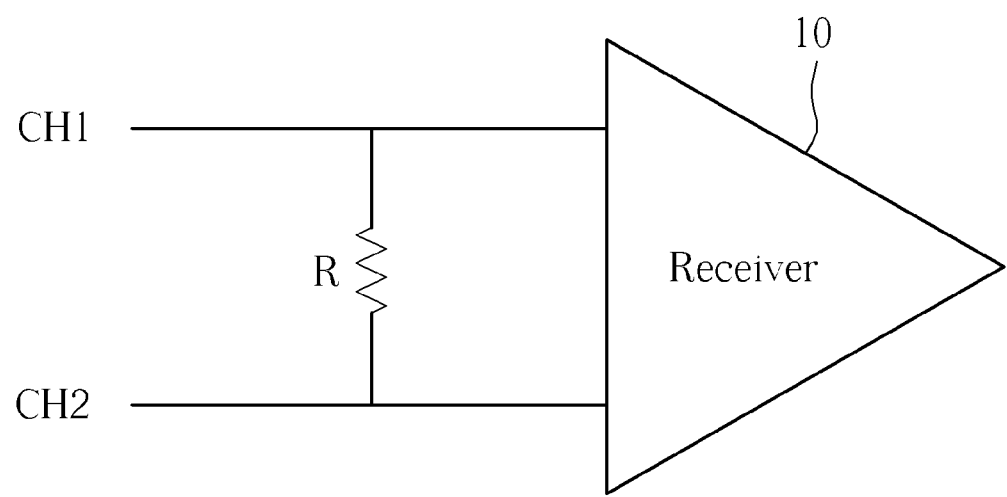
FIG. 1 is a schematic diagram of an interface circuit receiver according to the prior art.
Figure 2:
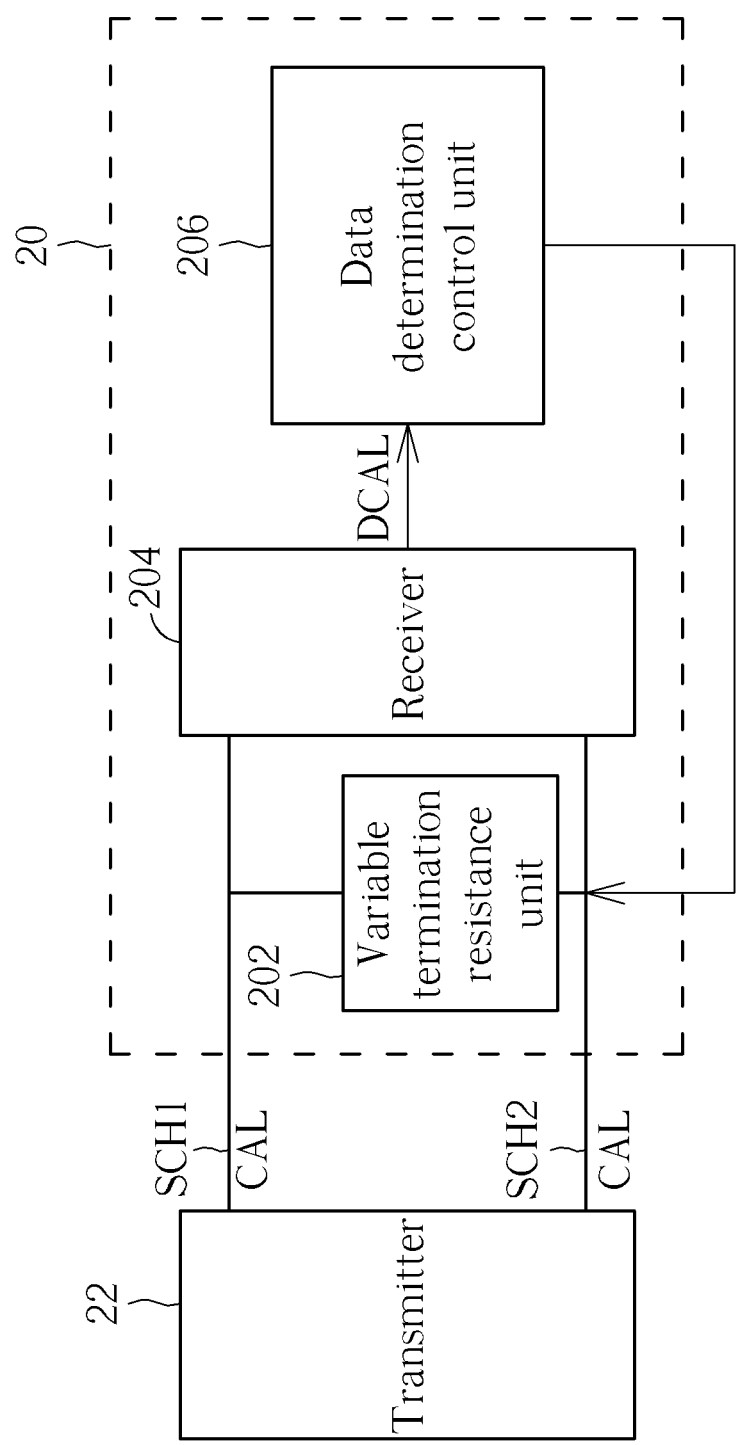
FIG. 2 is a schematic diagram of a reception circuit according to an embodiment of the present invention.

Please refer to FIG. 2, which is a schematic diagram of a reception circuit 20 according to an embodiment of the present invention. As shown in FIG. 2, the reception circuit 20 is coupled to a transmitter 22 via channels SCH1 and SCH2, and includes a variable termination resistance unit 202, a receiver 204, and a data determination control unit 206. In short, when the reception circuit 20 intends to receive a differential signal from the transmitter 22 via the channels SCH1 and SCH2l , the reception circuit 20 receives a calibration signal CAL from the transmitter 22 for calibration first. At this moment, the variable termination resistance unit 202 coupled to the channels SCH1 and SCH2 performs impedance matching with termination resistance currently corresponding to the channels SCH1 and SCH2 first. Then, the receiver 204 also coupled to the channels SCH1 and SCH2 receives the calibration signal CAL, and then performs signal process with the calibration signal CAL to generate a digital calibration signal DCAL (i.e. digital data) for the data determination control unit 206. Afterwards, the data determination control unit 206 compares the digital calibration signal DCAL with a predefined data PDA, and then adjusts the termination resistance corresponding to the channels SCH1 and SCH2 in the variable termination resistance unit 202 accordingly.

In such a condition, the receiver 204 can perform signal process with the calibration signal CAL received with the termination resistance currently corresponding to the channels SCH1 and SCH2 to generate the digital calibration signal DCAL. Then, the data determination control unit 206 determines whether the digital calibration signal DCAL conforms with the predefined data PDA and accordingly adjusts the termination resistance corresponding to the channels SCH1 and SCH2 in the variable termination resistance unit 202 to resistance which can make the digital calibration signal DCAL generated by the receiver 204 via signal process conform with the predefined data PDA (i.e. the termination resistance corresponding to the channels SCH1 and SCH2 in the variable termination resistance unit 202 substantially equals the termination resistance of the transmitter 22), so that the receiver 204 can process following differential signals received from the transmitter 22 to be correct. Therefore, the present invention can process the calibration signal CAL received via the channels to generate the digital calibration signal DCAL, and then determines whether the digital calibration signal DCAL conforms with the predefined data PDA, to adjust the corresponding termination resistance for calibration, so that accuracy of signal reception is enhanced.

Note that, timing for the receiver 204 to receive the calibration signal CAL is not limited to any particular timing. For example, please refer to FIG. 3 and FIG. 4, which are schematic diagrams of the receiver 204 shown in FIG. 2 which receives the calibration signal CAL at different timing. As shown in the upper part of FIG. 3, in conventional data transmission in the display interface without calibration mechanism, when display data is transmitted, there are time intervals with specific or non-specific lengths between unit data quantity during which display data is not transmitted. In such a condition, the receiver 204 can receive the calibration signal CAL during one time interval of not receiving any display data as the condition (A) shown in FIG. 3, or receive the calibration signal CAL during several time intervals of not receiving any display data as the condition (B) shown in FIG. 3 (i.e. the receiver 204 can receive the calibration signal CAL during at least one time interval of not receiving any display data). At this moment, the transmitter 22 can directly transmit the calibration signal CAL and the receiver 204 can directly receive the calibration signal CAL for process.

Figure 4:
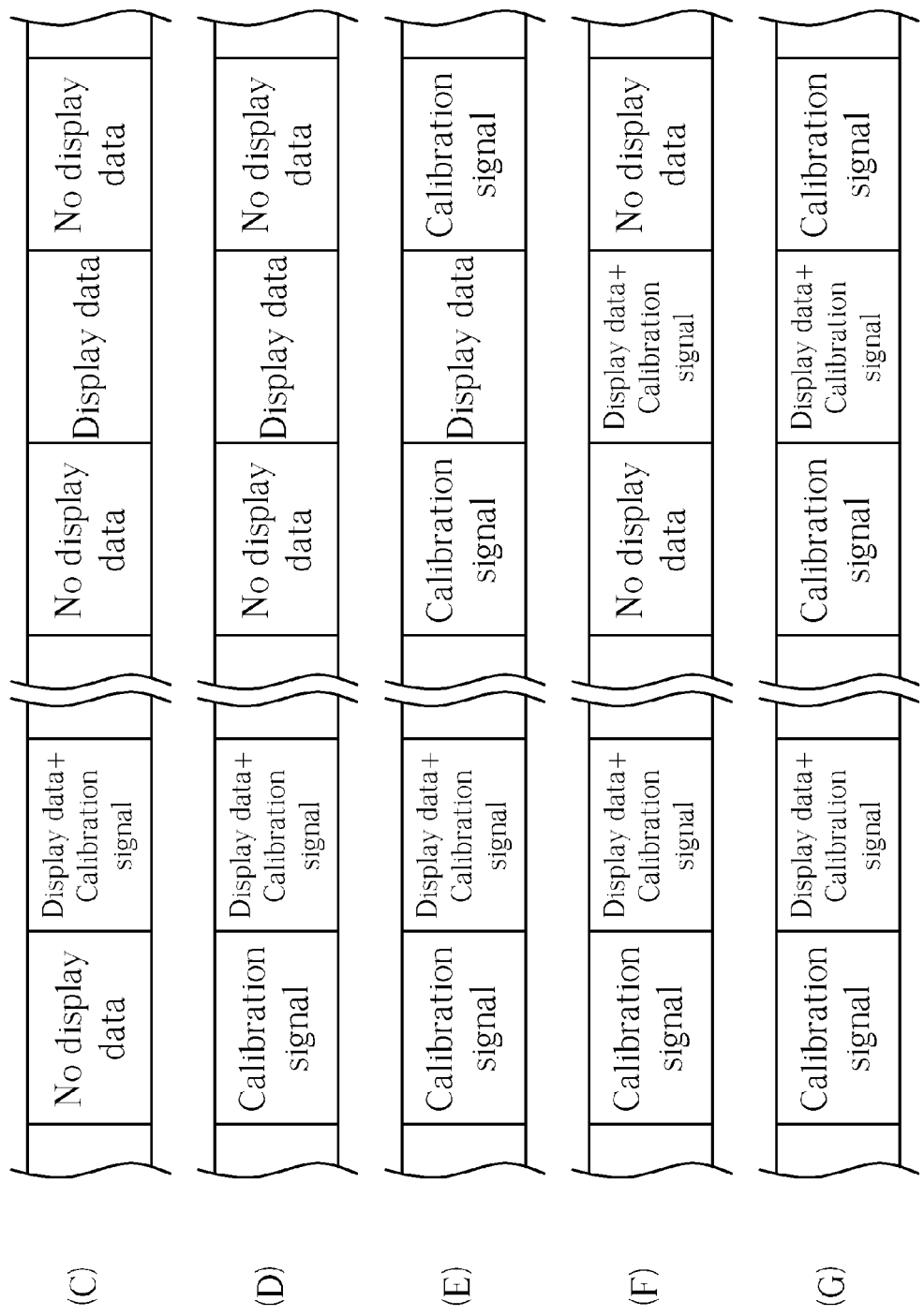

On the other hand, the receiver 204 can also receive the calibration data CAL during one time interval of receiving display data as the conditions (C), (D), and (E) shown in FIG. 4, or receive the calibration data CAL during several time intervals of not receiving any display data as the conditions (F), and (G) shown in FIG. 4 (i.e. the receiver 204 can receive the calibration signal CAL during at least one time interval of receiving a display data). At this moment, the transmitter 22 can encode the calibration signal CAL into a display data for transmission, and the receiver 204 can decode the calibration signal CAL from the received data for process. Note that, as the conditions (D), (E), (F) and (G) shown in FIG. 4, the receiver 204 can receive the calibration signal CAL during at least one time interval of receiving a display data and during at least one time interval of not receiving any display data, but this is not limited herein.

Figure 5:
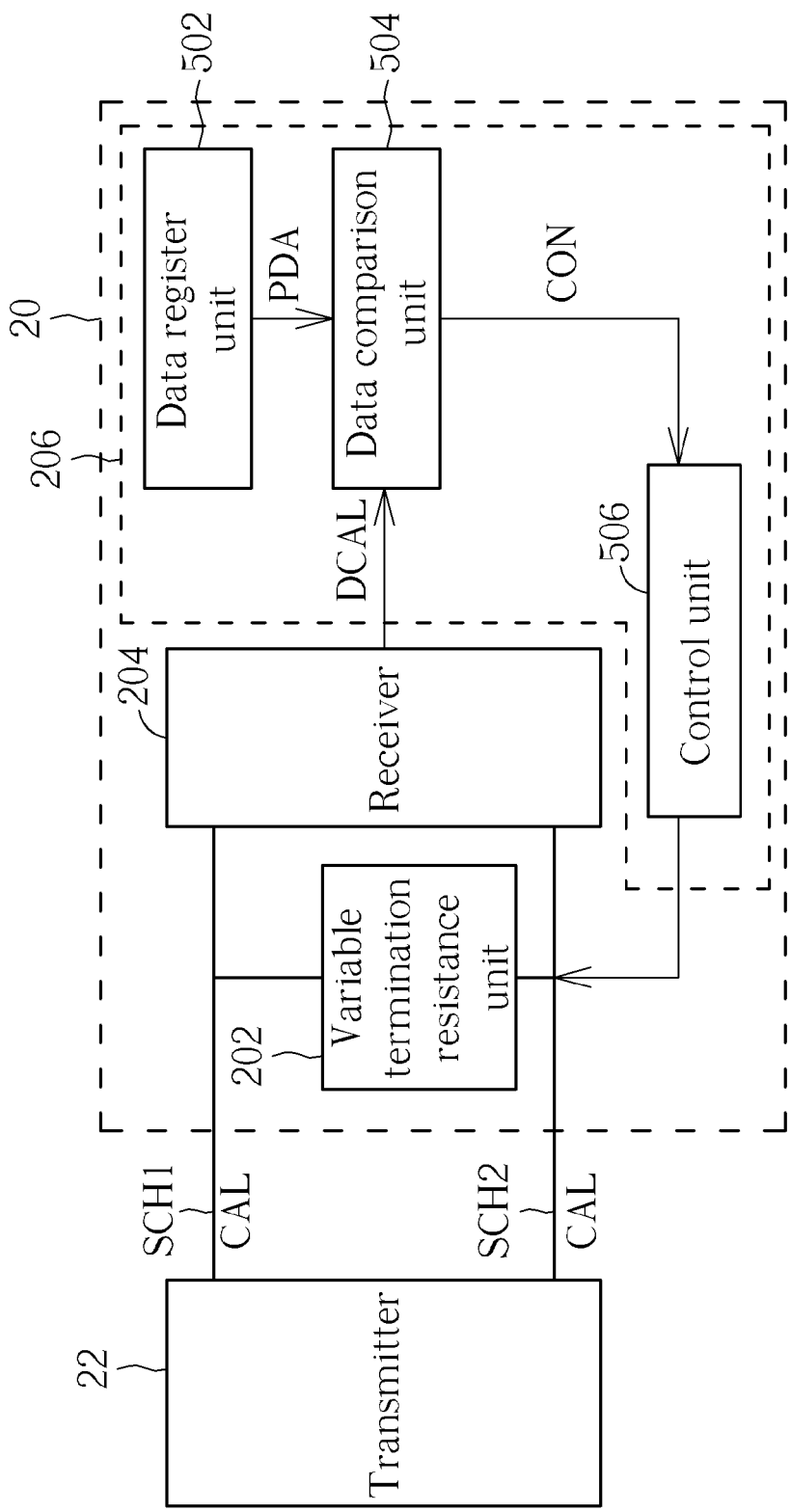
FIG. 5 is a detailed schematic diagram of the reception circuit shown in FIG. 2.

Further, for specific operations of the data determination control unit 206, please refer to FIG. 5, which is a detailed schematic diagram of the reception circuit 20 shown in FIG. 2. As shown in FIG. 5, the data determination control unit 206 further includes a data register unit 502, a data comparison unit 504, and a control unit 506. In short, the data register unit 502 can store the predefined data PDA, the data comparison unit 504 can compare the digital calibration signal DCAL with the predefined data PDA to generate a control signal CON to the control unit 506, and the control unit 506 can adjust the termination resistance corresponding to the channels SCH1 and SCH2 in the variable termination resistance unit 202 to the resistance which can make the digital calibration signal DCAL generated by the receiver 204 via signal process conform with the predefined data PDA according to the control signal CON, so that the receiver 204 can handle the following differential signal received from the transmitter 22 to be correct after calibration.

In detail, since the receiver 204 has an error margin when performing signal process with a received analog signal to generate a digital signal, when the data determination control unit 206 adjusts the termination resistance corresponding to the channels SCH1 and SCH2 to at least one specific resistance (i.e. the termination resistances corresponding to the channels SCH1 and SCH2 in specific region substantially equal the termination resistance of the transmitter 22), the digital calibration signal DCAL generated from the calibration signal CAL, which is received by the receiver 204 via the channels SCH1 and SCH2, conforms with the predefined data PDA. In such a condition, since the termination resistance corresponding to the channels SCH1 and SCH2 in the variable termination resistance unit 202 can switch between several resistances (such as 10 resistances), the data determination control unit 206 can adjust the termination resistance corresponding to the SCH1 and SCH2 from low to high. Until the termination resistance corresponding to the SCH1 and SCH2 is adjusted to a specific resistance which can make the digital calibration signal DCAL conforms with the predefined data PDA (such as the sixth resistance), the termination resistance corresponding to the SCH1 and SCH2 maintains the specific resistance, so that the receiver 204 can accordingly receive the following signals from the transmitter 22 via the channels SCH1 and SCH2 after calibration; or the data determination control unit 206 can adjust the termination resistance corresponding to the SCH1 and SCH2 with a switchable resistance to receive the calibration signal CAL, and obtain at least one specific resistance of the termination resistance which can make the digital calibration signal DCAL conforms with the predefined data PDA (such as the sixth to eighth resistances). At this moment, the termination resistance corresponding to the SCH1 and SCH2 can be set to an intermediate value of the at least one specific resistance for impedance matching (such as the seventh resistance), so that the receiver 204 can accordingly receive the following signal from the transmitter 22 via the channels SCH1 and SCH2 after calibration.

Note that, the main spirit of the present invention is to process the calibration signal CAL received via the channels to generate the digital calibration signal DCAL, and then determine whether the digital calibration signal DCAL conforms with the predefined data PDA, to adjust the reception circuit 20 for calibration, so that accuracy of signal reception can be enhanced. Those skilled in the art can make modifications or alterations accordingly. For example, in the above embodiment, the reception circuit receives the calibration signal from a transmitter via two channels and adjusts the corresponding termination resistance for calibration. But in other embodiments, the number of the channels, the transmitters, and the termination resistance can be other numbers according to the practical requirement (e.g. the reception circuit receives receiving signals via one channel from a transmitter or receives signals via respective channels from respective transmitters). Besides, in the above embodiment, the digital calibration signal DCAL conforms with the predefined data PDA by adjusting the termination resistance corresponding to the channels, but in other embodiments, the reception circuit can adjust at least one characteristic of the receiver 204 to make the digital calibration signal DCAL conform with the predefined data PDA.

Figure 6:
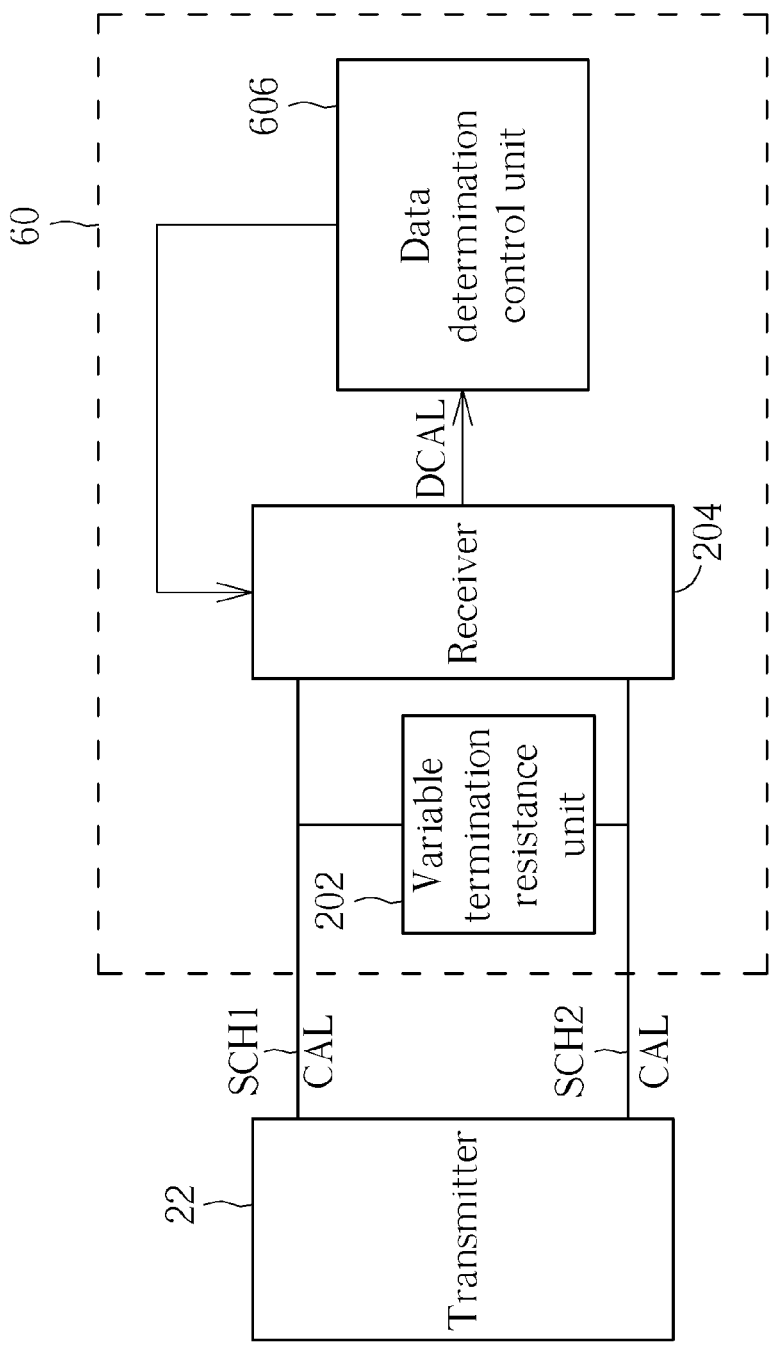
FIG. 6 is a schematic diagram of a further reception circuit according to an embodiment of the present invention.

For example, please refer to FIG. 6, which is a schematic diagram of another reception circuit 60 according to an embodiment of the present invention. As shown in FIG. 6, parts of the reception circuit 60 and the reception circuit 20 are similar. Therefore, elements with the same functions are denoted by the same symbols (e.g. the transmitter 22 shown in FIG. 6 is the same as the transmitter 22 in FIG. 2). The main difference between the reception circuit 60 and the reception circuit 20 is that the reception circuit 60 utilizes a fixed termination resistance to perform impedance matching for the channels SCH1 and SCH2 and thus does not include the variable termination resistance unit 202 shown in FIG. 2, and a data determination control unit 606 compares the digital calibration signal DCAL with the predefined data PDA and adjusts at least one characteristic of the receiver 204 accordingly (e.g. adjusting a bias current, an equalizer parameter, a circuit gain, or a bandwidth of the receiver 204).

In such a condition, the receiver 204 can perform signal process for the received calibration signal with the present characteristics to generate the digital calibration signal DCAL. Then, the data determination control unit 606 determines whether the digital calibration signal DCAL conforms with the predefined data PDA and accordingly adjusts at least one characteristic of the receiver 204 to which makes the digital calibration signal DCAL generated by the receiver 204 via signal process conform with the predefined data PDA, so that the receiver 204 can process following differential signals received from the transmitter 22 correctly after calibration. As a result, the present invention can process the calibration signal CAL received via the channels to generate the digital calibration signal DCAL, and then determines whether the digital calibration signal DCAL conforms with the predefined data PDA, to adjust at least one characteristic of the receiver 204 for calibration, so that accuracy of signal reception can be enhanced.

Figure 7:
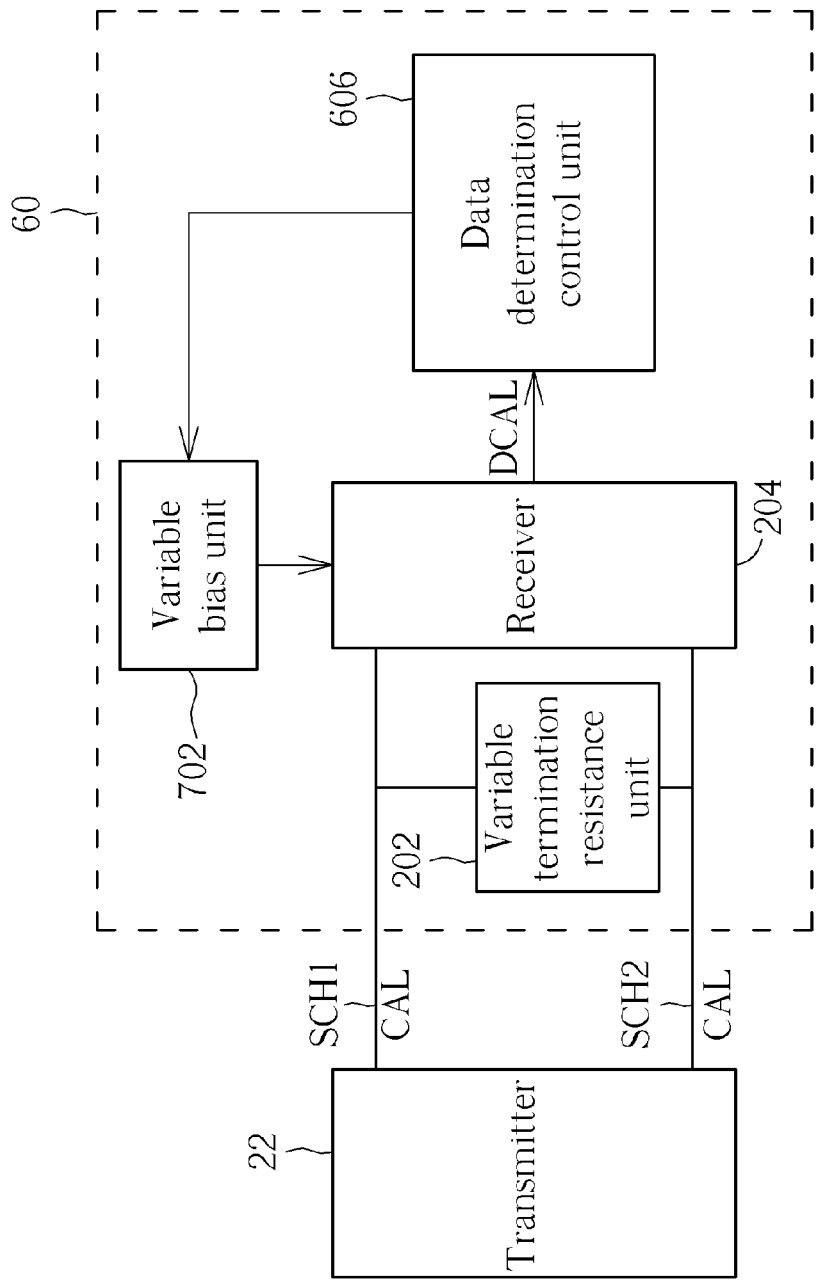
FIG. 7 is a detailed schematic diagram of the reception circuit shown in FIG. 6.

For example, please refer to FIG. 7, which is a detailed schematic diagram of the reception circuit 60 shown in FIG. 6. As shown in FIG. 7, the reception circuit 60 further includes a variable bias unit 702. According to indication of the data determination control unit 606, the variable bias unit 702 can adjust a bias current or a circuit gain of the receiver 204 to the value which makes the digital calibration signal DCAL generated by the receiver 204 via signal process conform with the predefined data PDA.

Figure 3:
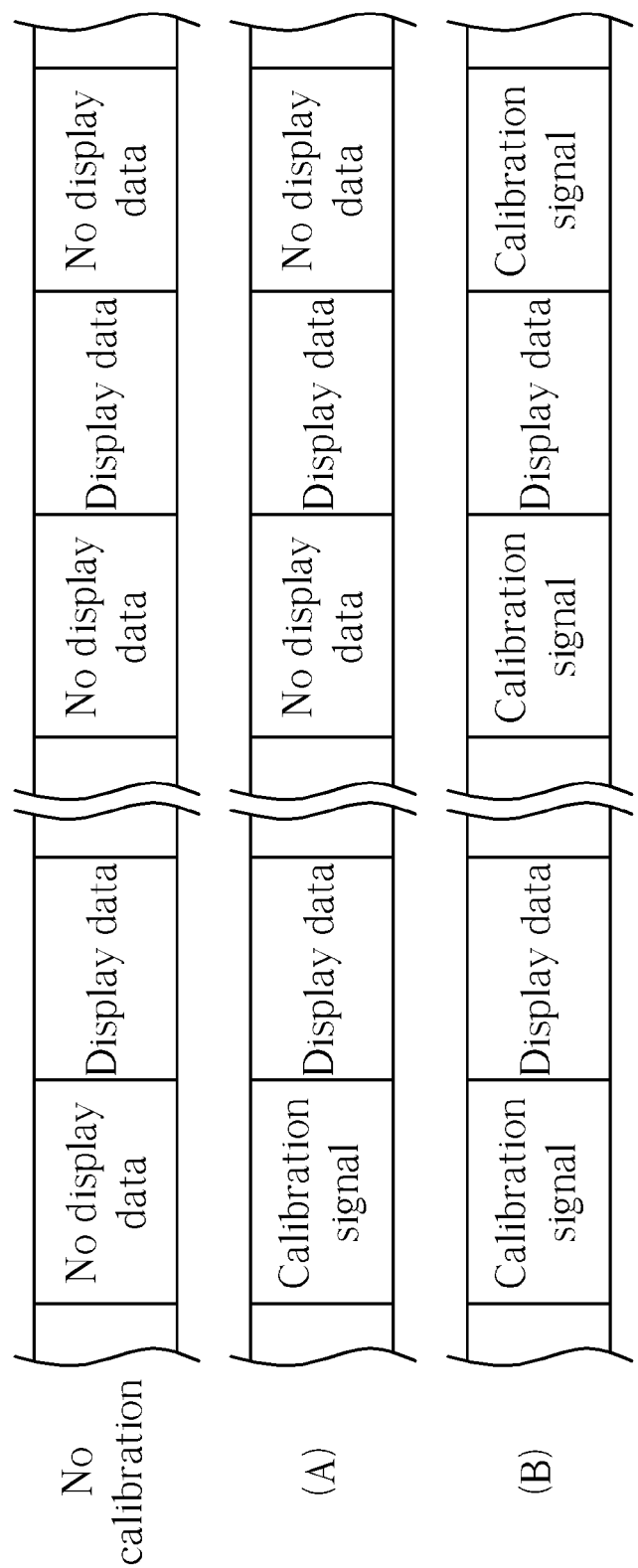
FIG. 3 and FIG. 4 are schematic diagrams of a receiver shown in FIG. 2 which receives a calibration signal at different time.

Besides, the timing of receiving the calibration signal CAL for the reception circuit 60 is the same as that for the reception circuit 20 shown in FIG. 3 and FIG. 4, and is not narrated hereinafter. Furthermore, the structure of the data determination control unit 606 can also be similar to that of the data determination control unit 206 in FIG. 5, except that a control unit included in the data determination control unit 606 is utilized for adjusting at least one characteristic of the receiver 204. In addition, as can be seen from above, since the receiver 204 has an error margin when the receiver 204 performs signal process with an analog signal to generate a digital signal, when the data determination control unit 606 adjusts at least one characteristic of the receiver 204 to at least one specific value (e.g. adjusting the bias current of the receiver 204 in a specific region), the digital calibration signal DCAL generated by the calibration CAL, which is received by the receiver 204 via the channels SCH1 and SCH2, conforms with the predefined data PDA. In such a condition, since at least one characteristic of the receiver 204 can switch between several values (e.g. 10 bias currents), the data determination control unit 606 can adjust at least one characteristic of the receiver 204 from low to high to receive the calibration signal CAL. Until at least one characteristic of the receiver 204 is adjusted to a specific value which can make the digital calibration signal DCAL conform with the predefined data PDA (such as the sixth bias current), the receiver 204 maintains the specific value, so that the receiver 204 can receive the following signals from the transmitter 22 via the channels SCH1 and SCH2; or, the data determination control unit 606 can adjust the at least one characteristic of the receiver 204 with a switchable value to receive the calibration signal CAL, and then obtain at least one specific value of at least one characteristic of the receiver 204 to make the digital calibration signal DCAL conform with the predefined data PDA (such as the sixth to eighth bias currents). At this moment, at least one characteristic of the receiver 204 can be set to an intermediate value of the at least one specific value for matching (such as the seventh bias current), so that the receiver 204 can receive the following signals from the transmitter 22 via the channels SCH1 and SCH2 after calibration.

Note that, in the above embodiment, the reception circuit 20 and the reception circuit 60 respectively adjust the termination resistance corresponding to the channels and at least one characteristic of the receiver 204, so as to make the digital calibration signal DCAL conform with the predefined data PDA. But in other embodiments, the termination resistance corresponding to the channels and at least one characteristic of the receiver 204 can be simultaneously adjusted so as to make the digital calibration signal DCAL conform with the predefined data PDA, which is not limited to these.

Figure 8:
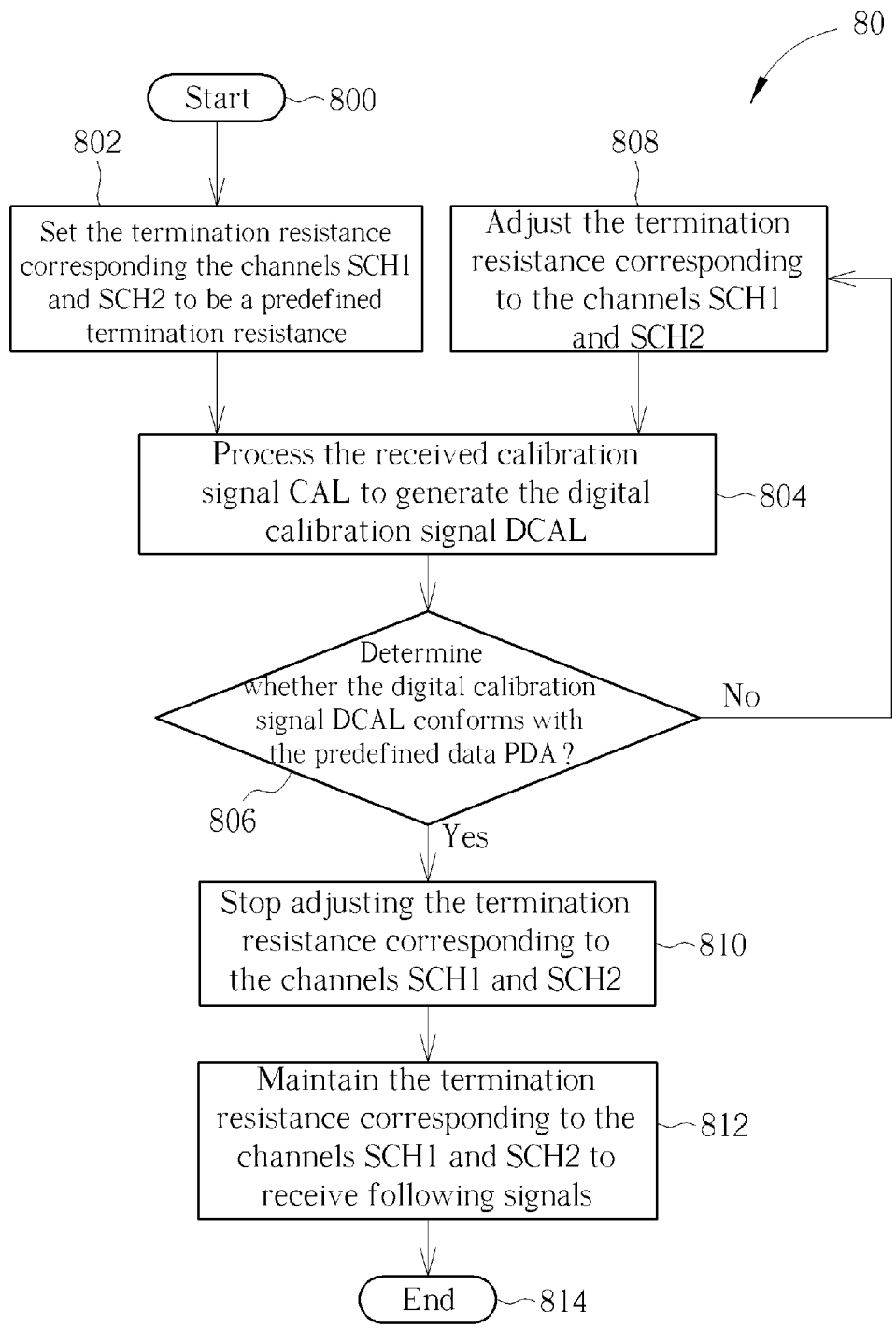
FIG. 8 is a schematic diagram of a calibration procedure according to an embodiment of the present invention.

Therefore, the calibration operation of the reception circuit 20 can be summarized into a calibration process 80, as shown in FIG. 8, including the following steps:

Step 800: Start.

Step 802: Set the termination resistance corresponding the channels SCH1 and SCH2 to be a predefined termination resistance.

Step 804: Process the received calibration signal CAL to generate the digital calibration signal DCAL.

Step 806: Determine whether the digital calibration signal DCAL conforms with the predefined data PDA. If yes, go to Step 810; otherwise, go to Step 808.

Step 808: Adjust the termination resistance corresponding to the channels SCH1 and SCH2.

Step 810: Stop adjusting the termination resistance corresponding to the channels SCH1 and SCH2.

Step 812: Maintain the termination resistance corresponding to the channels SCH1 and SCH2 to receive following signals.

Step 814: End.

Figure 9:
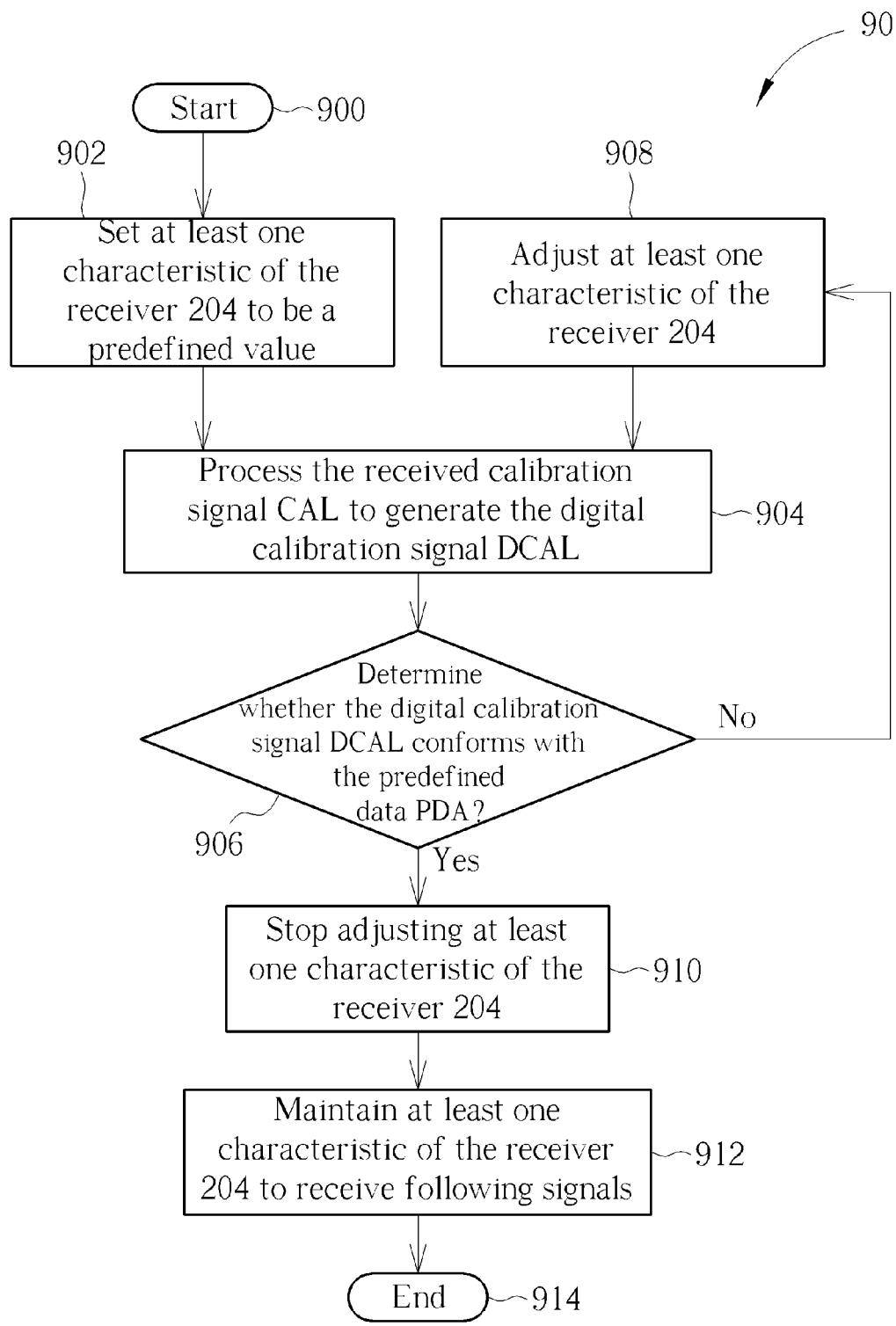
FIG. 9 is a schematic diagram of a further calibration procedure according to an embodiment of the present invention.

The calibration operation of the reception circuit 60 can be summarized into a calibration process 90, as shown in FIG. 9, including the following steps:

Step 900: Start.

Step 902: Set at least one characteristic of the receiver 204 to be a predefined value.

Step 904: Process the received calibration signal CAL to generate the digital calibration signal DCAL.

Step 906: Determine whether the digital calibration signal DCAL conforms with the predefined data PDA. If yes, go to Step 910; otherwise, go to Step 908.

Step 908: Adjust at least one characteristic of the receiver 204.

Step 910: Stop adjusting at least one characteristic of the receiver 204.

Step 912: Maintain at least one characteristic of the receiver 204 to receive following signals.

Step 914: End.

The details of the calibration processes 80 and 90 can be derived by referring to the above description about the reception circuits 20 and 60, and are not narrated hereinafter.

In the prior art, the resistance of the single termination resistance matching resistor R varies with many factors. Therefore, it is hard to realize the termination resistance matching resistor R with a resistance capable of accurately matching with termination resistance of the transmitter, so that the received data is incorrect. In comparison, the present invention can process the calibration signal CAL, received via the channels, to generate the digital calibration signal DCAL, and then determine whether the digital calibration signal DCAL conforms with the predefined data PDA, to adjust the termination resistance corresponding to the channels or at least one characteristic of the receiver 204 for calibration, so that accuracy of signal reception can be enhanced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A reception circuit, capable of enhancing accuracy of signal reception, comprising:
a variable termination resistance unit, coupled to at least one channel, for utilizing at least one termination resistance corresponding to the at least one channel to perform impedance matching;
a receiver, coupled to the at least one channel, for receiving a calibration signal to generate a digital calibration signal; and
a data determination control unit, for comparing the digital calibration signal with a predefined data, to adjust the at least one termination resistance.

2. The reception circuit of claim 1, wherein the receiver receives the calibration signal during at least one time interval of not receiving any display signal.

3. The reception circuit of claim 1, wherein the receiver receives the calibration signal during at least one time interval of receiving a display signal.

4. The reception circuit of claim 1, wherein the receiver receives the calibration signal during at least one time interval of receiving a display signal and at least one time interval of not receiving any display signal.

5. The reception circuit of claim 1, wherein the data determination control unit comprises:
a data register unit, for storing the predefined data;
a data comparison unit, coupled to the receiver and the data register unit, for comparing the digital calibration signal with the predefined data to generate a control signal; and
a control unit, for adjusting the at least one termination resistance corresponding to the at least one channel in the variable termination resistance unit according to the control signal.

6. The reception circuit of claim 1, wherein when the data determination control unit adjusts one resistance of the at least one termination resistance to at least one specific resistance, the digital calibration signal generated by the calibration signal, which is received by the receiver via a corresponding channel, conforms with the predefined data.

7. The reception circuit of claim 6, wherein when the data determination control unit adjusts the one resistance of the at least one termination resistance to one specific resistance of the at least one specific resistance, the one resistance of the at least one termination resistance maintains the specific resistance to perform impedance matching, so that the receiver receives following signals in the corresponding channel accordingly.

8. The reception circuit of claim 6, wherein the one resistance of at least one termination resistance is set to an intermediate value of the at least one specific resistance to perform impedance matching, so that the receiver receives following signals in the corresponding channel accordingly.

9. A reception circuit, capable of enhancing accuracy of signal reception, comprising:
a receiver, coupled to at least one channel, for receiving a calibration signal to generate a digital calibration signal; and
a data determination control unit, for comparing the digital calibration signal with a predefined data to adjust at least one characteristic of the receiver.

10. The reception circuit of claim 9, wherein the receiver receives the calibration signal during at least one time interval of receiving display data.

11. The reception circuit of claim 9, wherein the receiver receives the calibration signal during at least one time interval of not receiving display data.

12. The reception circuit of claim 9, wherein the receiver receives the calibration signal during at least one time interval of receiving display data and at least one time interval of not receiving display data.

13. The reception circuit of claim 9, wherein the data determination control unit adjusts a bias current, an equalizer parameter, a circuit gain, or a bandwidth.

14. The reception circuit of claim 9 further comprises a variable bias unit, for adjusting a bias current or a circuit gain of the receiver, according to the indication of the data determination control unit.

15. The reception circuit of claim 9, wherein the data determination control unit comprises:
a data register unit, for storing the predefined data;
a data comparison unit, coupled to the receiver and the data register unit, for comparing the digital calibration signal with the predefined data to generate a control signal; and
a control unit, for adjusting the at least one characteristic of the receiver according to the control signal.

16. The reception circuit of claim 9, wherein when the data determination control unit adjusts the at least one characteristic to at least one specific value, the digital calibration signal generated by the calibration signal, which is received by the receiver via a corresponding channel, conforms with the predefined data.

17. The reception circuit of claim 15, wherein when the data determination control unit adjusts the at least one characteristic to one specific value of at least one specific value, the receiver maintains the specific value to receive following signals in the corresponding channel.

18. The reception circuit of claim 15, wherein the receiver is set to an intermediate value of the at least one specific value so as to receive the following signals in the corresponding channel.

* * * * *